May 8, 1962 K. P. BILLNER 3,032,868
FILTER
Filed Nov. 2, 1956 2 Sheets-Sheet 1

*INVENTOR*
KARL P. BILLNER
BY Raymond W Cotton
*ATTORNEY*

May 8, 1962 K. P. BILLNER 3,032,868
FILTER
Filed Nov. 2, 1956 2 Sheets-Sheet 2
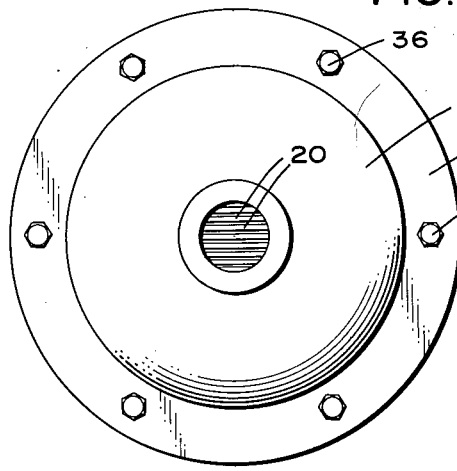
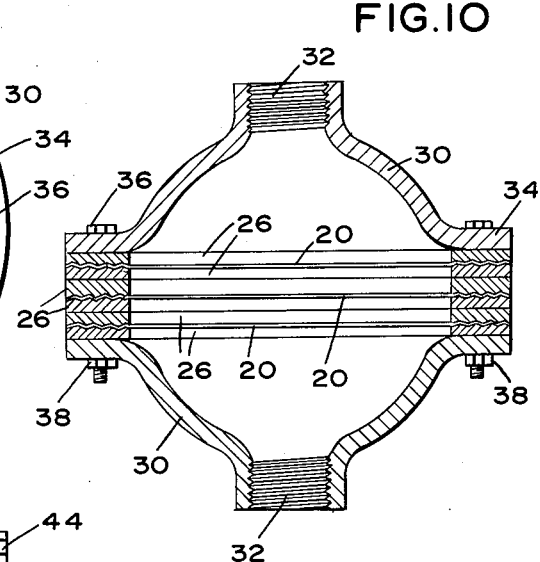
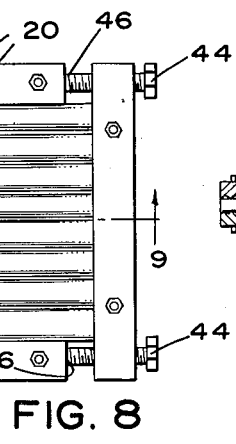
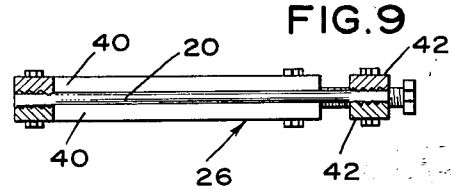
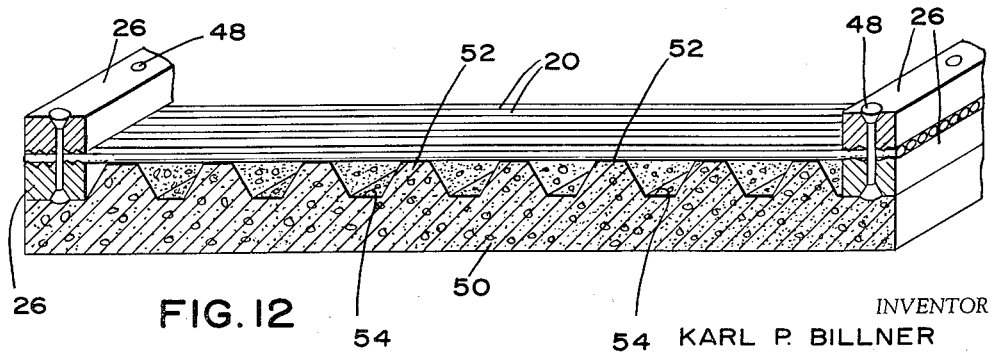
INVENTOR
KARL P. BILLNER
BY *Raymond Wootten*
ATTORNEY United States Patent Office 3,032,868
Patented May 8, 1962

3,032,868
FILTER
Karl P. Billner, 4210 Sansom St., Philadelphia, Pa.
Filed Nov. 2, 1956, Ser. No. 620,140
1 Claim. (Cl. 29—452)

This invention relates to filters suitable for a variety of uses, but particularly to precision filters for the separation of fine particles.

The many uses contemplated include the medical, chemical, pharmaceutical, biological, bacteriological and kindred fields, the separation of solids from smoke, engine exhausts, gases and vapors generally, and the filtration of water supplies and other liquids.

Filtration for such purposes has long relied upon the use of ceramics, earths, natural and synthetic fibers, granules, woven mesh, and felted filaments composed of various materials. It has also been proposed to employ permanently deformed spaced filaments composed of such material as copper, as will be illustrated by the disclosure of the patent to Rubissow, No. 2,271,662 dated February 3, 1942. None of these types of filters has been adequate however, since they have not provided small openings having the degree of uniformity for which the demand has been so great.

The solution to this long existing problem has been based upon principles that have in themselves been previously established. It is well known of course, that when a solid body of incompressible material is placed under tension, although its dimensions change, its volume remains constant. It is also known that when such a body is placed under tension not exceeding its elastic limit, its cross section will be reduced uniformly. Accordingly, by arranging a plurality of filaments of circular cross section in contact parallel with their axes and applying tension to the filaments while holding their axes in a constant spaced relationship, proximate filaments will define a gap which is uniform throughout its length and whose width is equal to the sum of half the diameter reduction of the proximate filaments resulting from the tension.

By employing commercially available wire of 0.004 inch diameter, it becomes quite feasible in accordance with the present invention to produce a filter containing uniform openings of the order of 0.000,001 inch. The filament diameter will vary from such relatively small values to substantially larger ones, depending upon the particular requirements to be met. For municipal water systems for example, filaments of 0.25 inch diameter or even larger would adapt themselves admirably.

Accordingly, the present invention can be characterized as relating to a filter comprising a frame, a plurality of parallel filaments of circular cross section carried by the frame under substantially equal positive tension less than their elastic limits but sufficient to increase their lengths and uniformly reduce their diameters, proximate filaments defining a uniform gap whose width is equal to the sum of half the diameter reduction of the proximate filaments resulting from the tension. These filaments may be arranged so that they are tangent to a common plane. The frame may be adjustable in order to vary the tension applied to the filaments and thereby change the openings defined between them. In a preferred form, the proximate filaments have equal cross sections and their composition may be steel. It is contemplated that the filter be composed of a plurality of layers of parallel filaments and adjacent layers may be disposed at various angles with respect to one another.

The method of producing a filter according to this invention comprises arranging a plurality of filaments of circular cross section in parallel abutment, applying tension to the filaments less than their elastic limit but sufficient to produce longitudinal extension, radial reduction and uniform gaps between them, and clamping the filaments in extended condition while under such tension.

A more complete understanding of the invention will follow from a description of the drawings wherein:

FIG. 8 is a plan view depicting a filter having adjusting means for varying the tension of the filaments;

FIG. 9 is a section taken along line 9—9 of FIG. 8;

FIG. 10 is a sectional elevation depicting a filter having multiple stacks adapted for use in a pipe line;

FIG. 11 is a plan view of the filter depicted in FIG. 10; and

FIG. 12 is a fragmentary isometric view, partially in cross section, depicting a form of filter suited for use in the treatment of water for municipal purposes.

Figure 2:
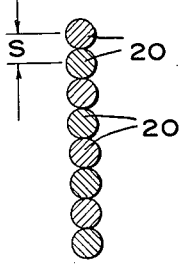
FIG. 2 is a section taken along line 2—2 of FIG. 1.
Figure 1:
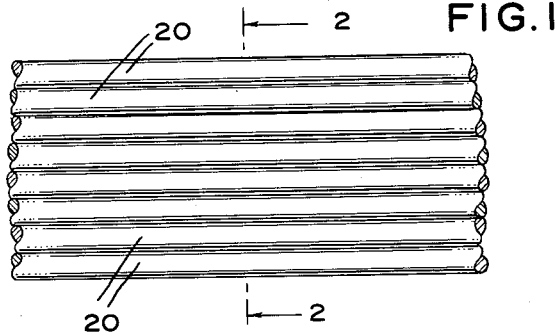
FIG. 1 is a fragmentary plan view depicting the first step employed in producing a filter according to the present invention.
Figure 4:
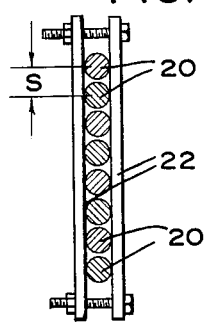
FIG. 4 is a section taken along line 4—4 of FIG. 3.
Figure 3:
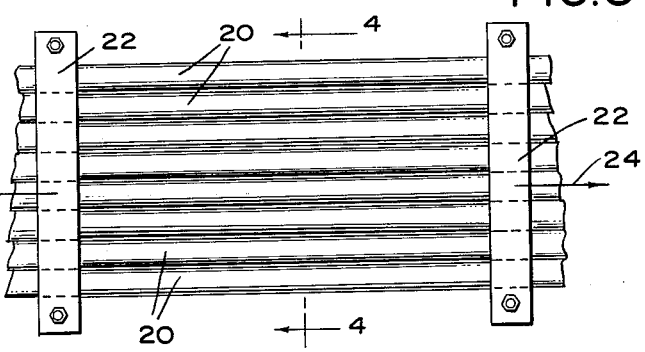
FIG. 3 is a plan view depicting a subsequent step in the production of a filter according to the present invention.
Figure 6:
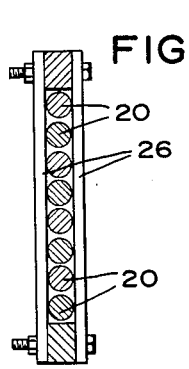
FIG. 6 is a sectional elevation taken along line 6—6 of FIG. 5.

The filaments 20 are shown in FIGS. 1 and 2 as arranged in abutment parallel to their axes under which circumstances, assuming uniform diameters, their axial distance or pitch can be represented by the distance $s$. In view of their circular cross sections, the contacts between contiguous filaments will be linear and by suitably packing them together, there will be no openings between them. While in this condition, the filaments are subjected to uniform tension by means of suitable clamps 22, the tension being applied in a direction parallel to the axes of the filaments as indicated by the arrows 24. By reference to FIG. 4 it will be clear that the distance between the axes of adjacent filaments or pitch $s$ remains constant yet between the opposed clamps 22 of FIG. 3, the cross sections of the filaments have been uniformly reduced to produce uniform openings between adjacent filaments.

Figure 5:
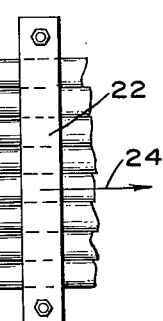
FIG. 5 is a plan view depicting a further step in the production of a filter in accordance with the present invention.

While still under tension, the filaments 20 are secured by means of a frame 26 as shown in FIG. 5, to maintain the uniform spaces between adjacent filaments. Following this application of the frame to permanently clamp the filaments in the spaced relationship desired, the filaments may be severed between the frame 26 and the clamps 22 for its intended use.

Figure 7:
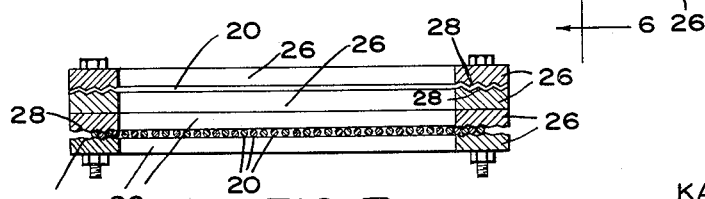
FIG. 7 is a sectional elevation of a filter employing stacked layers of parallel filaments.

Two such frames have been depicted in stacked relationship in FIG. 7 wherein the filaments of one frame are arranged perpendicular to the filaments of the other. It will be understood that this angular relationship can be selected as desired. The members constituting the frame are shown as provided with complementary corrugations 28 for effectively gripping the ends of the filaments 20. The frame members may be secured together by the use of nuts and bolts as indicated by way of example, or otherwise as by riveting, welding, or other expedients known to those skilled in the art.

The filter of FIG. 10 depicts three layers of stressed filaments 20 arranged in their frames 26 combined with fittings 30 defining a housing having internally formed threads 32 for application to tubular members having complementary threads. Such a filter can be applied to a faucet or to an intermediate portion of a pipeline. The various layers of stressed filaments can provide openings which are progressively smaller in the direction of fluid flow to facilitate cleaning by back flushing, and to extend the period of use of such a filter before cleaning becomes necessary.

As shown in FIGS. 10 and 11, the fittings 30 defining the housing are provided with flanges 34 through which bolts 36 are inserted for the reception of nuts 38 to secure the parts together in fluid tight relationship.

In order to produce an adjustable filter, the frame 26 may be separable as depicted in FIGS. 8 and 9 wherein adjacent ends of the filaments 20 are clamped between yoke members 40 constituting a portion of the frame, the opposite ends of the filaments being clamped between strap members 42 constituting another portion of the frame. By means of a pair of screws 44 threadedly received by the strap members 42, their ends 46 will be advanced into abutment with the ends of the yoke members 40 to maintain the filaments 20 under the degree of tension required to effect and maintain a proper spaced relationship. A filter of this type is eminently suited for laboratory use where it is necessary or desirable to vary the openings between adjacent filaments.

In a somewhat diagrammatic manner, FIG. 12 illustrates an application of a filter of the type under consideration to water filtration as might be employed in municipal water systems. Here again the filaments 20 are maintained in stressed relationship under tension in a frame 26 which in this instance has been depicted as held together by means of rivets 48, the assembly being supported on a concrete foundation 50 having projections 52 actually supporting the filaments against undue forces which might result in damage and also defining channels 54 to facilitate the flow of liquids passing through the spaced filaments.

With commercially available wire having a diameter of 0.004 inch it has become quite feasible by virtue of the present invention to produce filters having uniform openings of the order of 0.000,001 inch. Assuming that the stress $f$ to be applied to a steel wire is 20,000 lbs. per sq. in., its modulus of elasticity E being approximately 30,000,000 and the length L of the filaments constituting the filter to be 10 inches, then:

$$t = L\frac{f}{E}$$

The volume of such a filament can then be expressed as:

$$0.004^2 \times 10 \times \frac{\pi}{4} = V$$

If $d$ represents the diameter of each filament after subjected to tension and $t$ is the amount of elongation as in the equation above, then the volume can also be expressed as:

$$d^2 \times (10+t) \times \frac{\pi}{4} = V$$

Solving these equations we have first:

$$t = \frac{10 \times 20000}{30,000,000} = 0.0066 \text{ inch}$$

And substituting this value for $t$ in:

$$0.004^2 \times 10 \times \frac{\pi}{4} = d^2(10+0.0066) \times \frac{\pi}{4}$$

and solving for $d$ it is found that it has a value of 0.003999, which, subtracted from the initial diameter of 0.004, gives a value of 0.000,001 inch as the spacing between adjacent filaments.

Naturally, other values can be selected for the spacing between adjacent filaments, both larger and smaller than one millionth of an inch. The composition of the filaments can also vary within reasonable limits so long as their elastic limits are not exceeded. It is preferable that the compositions selected, such as steel, corrosion resistant alloys and glass have relatively high elastic limits and resist permanent deformations of various types.

Whereas the invention has been described with reference to a relatively few examples, it should not be restricted thereto beyond the scope of the appended claim.

I claim:

A method of producing a filter comprising arranging a plurality of filaments of circular cross section in parallel abutment, applying tension to said filaments less than their elastic limit but sufficient to produce longitudinal extension, radial reduction and uniform gaps between them, and clamping said filaments in extended condition while under tension.

References Cited in the file of this patent

UNITED STATES PATENTS

| | | |
|---|---|---|
| 1,308,998 | Stone | July 8, 1919 |
| 1,615,559 | Tark | Jan. 25, 1927 |
| 1,886,173 | Flint | Nov. 1, 1932 |
| 2,006,405 | Monroe | July 2, 1935 |
| 2,271,662 | Rubissow | Feb. 3, 1942 |
| 2,750,044 | Nordell | June 12, 1956 |
| 2,907,404 | Mare | Oct. 6, 1959 |